(12) United States Patent
Hack (10) Patent No.: US 7,797,564 B2
(45) Date of Patent: Sep. 14, 2010

(54) METHOD, APPARATUS, AND COMPUTER PROGRAM PRODUCT FOR DYNAMICALLY MODIFYING OPERATING PARAMETERS OF THE SYSTEM BASED ON THE CURRENT USAGE OF A PROCESSOR CORE'S SPECIALIZED PROCESSING UNITS

(75) Inventor: Mark Elliott Hack, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1513 days.

(21) Appl. No.: 11/136,654

(22) Filed: May 24, 2005

(65) Prior Publication Data

US 2006/0271937 A1  Nov. 30, 2006

(51) Int. Cl.
G06F 11/00  (2006.01)
(52) U.S. Cl. ............................................. 714/1; 714/10
(58) Field of Classification Search ................. 718/100, 718/102, 103, 104, 107, 105; 712/206, 218, 712/225
See application file for complete search history.

(56) References Cited

U.S. PATENT DOCUMENTS

| | | | | |
|---|---|---|---|---|
| 4,870,570 | A | * | 9/1989 | Satoh et al. ................. 713/320 |
| 5,414,851 | A | * | 5/1995 | Brice et al. ................. 718/104 |
| 5,699,460 | A | * | 12/1997 | Kopet et al. ................. 382/307 |
| 5,721,855 | A | * | 2/1998 | Hinton et al. ............... 712/218 |
| 6,226,738 | B1 | * | 5/2001 | Dowling ...................... 712/225 |
| 7,062,559 | B2 | * | 6/2006 | Yoshimura et al. .......... 709/226 |
| 7,155,498 | B1 | * | 12/2006 | Hirata et al. ................ 709/223 |
| 7,251,594 | B2 | * | 7/2007 | Krishnan ..................... 703/26 |
| 2002/0087618 | A1 | * | 7/2002 | Bohm et al. ................ 709/201 |
| 2002/0156899 | A1 | * | 10/2002 | Sekiguchi ................... 709/227 |
| 2003/0217251 | A1 | * | 11/2003 | Jourdan et al. ............. 712/225 |

(Continued)

FOREIGN PATENT DOCUMENTS

EP  1182548 A  2/2002

(Continued)

OTHER PUBLICATIONS

Maestre et al., "A Form Approach to Context Scheduling for Multicontext Reconfigurable Architectures", IEEE Transaction on Very Large Scale Integration Systems, IEEE Service Center, Piscataway, NJ, vol. 9, No. 1, Feb. 2001.

(Continued)

*Primary Examiner*—Dieu-Minh Le
(74) *Attorney, Agent, or Firm*—Yee & Associates, P.C.; Diana R. Gerhardt (57) ABSTRACT

A method, apparatus, and computer program product are disclosed in a data processing system for dynamically modifying operating parameters of processing units included in a processor core that is included in a central processing unit. A next context to be processed is received. The next context includes an identification of all first specialized processing units that will be needed to process the next context. All second specialized processing units are identified that were needed to process a previous context that has just finished being processed by the processor core. A comparison between the first units and the second units is made to generate an identification of third units and fourth units. Operating parameters of the processing units included within the processor core are altered to optimize the processing units to a state where the third units will be used and the fourth units will not be used.

17 Claims, 6 Drawing Sheets

U.S. PATENT DOCUMENTS

2004/0252768 A1* 12/2004 Suzuki et al. .......... 375/240.24
2008/0005534 A1* 1/2008 Jourdan et al. .............. 712/206

OTHER PUBLICATIONS

Fohler, "Changing Operational Modes in teh Context of Pre Runtime Scheduling", IEICE Transactions on Information and Systems, Information & Systems Society, Tokyo, Japan, vol. E76-D, No. 11, pp. 1333-1340.

Maestre et al., "Kernel Scheduling in Reconfigurable Computing", Design, Automation and Test in Europe Conference and Exhibition 1999, Proceedings, Munich Germany, pp. 90-96.

Noguera et al., "Multitasking on reconfigurable architectures: microarchitecture support and dynamic scheduling", ACM Transactions on Embedded Computing Systems, vol. 3, No. 2, May 2004, pp. 385-406.

Goswami et al., "Prediction-Based Dynamic Load-Sharing Heuristics", IEEE Transactions on Parallel and Distributed Systems, IEEE Service Center, Los Alamitos, CA, vol. 4, No. 6, Jun. 1993, pp. 638-648.

Noguera et al., "Power-performance trade-offs for reconfigurable computing", Hardware/Software Codesign and System Synthesis, 2004. International conference on Codes + ISSS 2004, Stockholm, Sweden Sep. 2004, Piscataway, NJ IEEE Sep. 2004, pp. 116-121.

* cited by examiner

METHOD, APPARATUS, AND COMPUTER PROGRAM PRODUCT FOR DYNAMICALLY MODIFYING OPERATING PARAMETERS OF THE SYSTEM BASED ON THE CURRENT USAGE OF A PROCESSOR CORE'S SPECIALIZED PROCESSING UNITS

BACKGROUND OF THE INVENTION

1. Technical Field

The present invention is directed to data processing systems. More specifically, the present invention is directed to a method, apparatus, and computer program product for dynamically modifying the operating parameters of the system, including the processor, memory, and cache, based on the current usage of specialized processing units included in the processor core.

2. Description of Related Art

A symmetric multiprocessing (SMP) data processing system has multiple processors that are symmetric such that each processor has the same processing speed and latency. An SMP system has one operating system that divides the work into tasks that are distributed evenly among the various processors by dispatching one software thread of work to each processor at a time. Thus, a processor in an SMP system executes only one thread at a time.

A simultaneous multi-threading (SMT) data processing system includes multiple processors that can each concurrently execute more than one thread at a time per processor. An SMT system has the ability to favor one thread over another when both threads are running on the same processor.

A processor core includes processing units. Some of the processing units are general purpose units, such as instruction sequencing units and integer units, which are used for general purpose processing. Some of the processing units are special purpose units that are used for specialized processing. For example, a vector multimedia extensions (VMX) unit is a specialized unit that provides vector graphic processing of vectors of floating point values while a different specialized unit, a floating point (FP) unit, provides processing of floating point numbers. There are specialized instructions that take advantage of the functions of the specialized units. When a specialized instruction is executed, a specialized processing unit is used during at least a part of the processing of the instruction to process the instruction.

Each task to be executed by a processor core includes a set of instructions to be executed. When a task is to be executed, a context is created that identifies the instructions in the task as well as the particular specialized units that will be used to execute the instructions of the context. The context is updated based on the detection of the use of these specialized instruction units during execution, with the first execution of an instruction destined to these units setting the use indicator. When a task is switched, the register values and states of the general purpose and specialized units are typically saved. This context may then be retrieved for continued processing at a later time. When the context is retrieved for continued processing, the register values and states of the general purpose and specialized units are restored.

Some operating systems, such as AIX and Linux, are sensitive to the use of these specialized instructions. These known operating systems are aware of which specialized units are needed and used for each context.

Currently, the processing units of a processor may be shared among different tasks. For example, the PowerPC™ utilizes a prefetch unit. The prefetch unit shares prefetch streams between the general purpose units and the specialized processor units, such as the floating point processor and the VMX instruction units. The default sharing assignment typically shares the prefetch unit equally between the general purpose units and the specialized units. Thus, the general purpose units receive 50% and the specialized units receive 50% of the prefetch unit's total time. This allocation of the prefetch unit between general purpose units and specialized units is set regardless of whether or not the task being currently processed uses a specialized unit. Thus, in known systems, the prefetch unit may have 50% of its time allocated to specialized units even though the current task does not use any specialized units.

The manner in which a processing unit is shared among tasks is typically set statically during an initialization process before the system that includes the processing unit begins its normal execution. Once the system is in its normal execution mode after being powered on and booted, the manner in which the unit is shared is not changed dynamically.

Further, the allocation of a processing unit is typically set according to predictions that are made as to what an optimal operating allocation would be. The actual operating conditions do not cause this allocation to change. As described above, a prediction is made based on expected performance that the optimal allocation of a prefetch unit is to have its time allocated equally between the general purpose units and specialized units. The allocation is maintained during execution without regard to the actual operating conditions. For example, as described above, a particular task may not require any specialized units at all. For this particular task, the optimal allocation of the prefetch unit is not the predicted case where the prefetch unit is allocated equally between the general purpose units and the specialized units. During the execution of this particular task, the processor that includes this prefetch unit is not operating in an optimal state.

Another example of where a processor is not operating in an optimal state involves the power supplied to the processing units of the processor. The various units of a processor core have power supplied to them when they are executing instructions. However, there are times when a unit may be sitting idle waiting for useful work to perform. In this case, when a unit is sitting idle waiting for useful work, the unit is consuming power even though the unit is not being used.

The specialized units of a processor are typically turned off until they are needed for a particular task. When they are first needed, the specialized units are then turned on. Once they are turned on, however, they remain on regardless of whether they are still needed. Thus; once a specialized unit is turned on, it remains powered on even if that specialized unit is no longer needed in the execution of any other task. Leaving specialized units powered on even though they are not being used, consumes power unnecessarily and also adds an unnecessary burden to the heat dissipation units of the processor.

Therefore, a need exists for a method, apparatus, and computer program product for dynamically modifying the operating parameters of a processor according to which instructions are currently being executed.

SUMMARY OF THE INVENTION

A method, apparatus, and computer program product are disclosed in a data processing system for dynamically modifying-operating parameters of a system, dependent on which specialized instruction units are currently being used. When a task is created, a corresponding context area is created which is initialized to indicate that no specialized units are being used. When the use of a specialized unit is detected, the context area is updated to indicate the usage of the specialized processing unit. When the task is switched, a next context to be processed is received. The next context includes an identification of all first specialized processing units that will be needed to process the next context. All second specialized processing units are identified that were needed to process a previous context that has just finished being processed by the processor core. A comparison between the first units and the second units is made to generate an identification of all third units that were needed for the previous context but that are not needed for the next context and all fourth units that were not needed for the previous context but that are needed for the next context. Operating parameters of the processing units included within the processor core are altered to optimize the processing units to a state that takes advantage of the fact that the third units will be used and the fourth units will not be used.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a method, apparatus, and computer program product for dynamically modifying the operating parameters of the processing units included in a processor core according to which instructions are being executed. The processor core is included within a central processing unit (CPU). A CPU is implemented using a single integrated circuit chip.

The operating parameters of the processing units are modified according to which specialized units are currently being utilized by the task that is being processed. The operating parameters may be modified by changing allocation of units and/or by altering the current power states of the units.

The floating point unit and the VMX unit are both examples of specialized processing units.

The present invention takes advantage of the fact that a context includes an identification of each specialized processing unit that will be needed to process the instructions of the context. The method of identifying within a context which specialized units are needed to process the instructions of that context is known in the art and not described herein.

According to the present invention, when a next context is fetched and about to be processed, the next context is used to identify which specialized processing units are going to be needed by the processor core to execute the next context. A determination is made as to which specialized processing units were needed by the processor core to execute the previous context, i.e. the context that just finished being processed.

The processor can be optimized dynamically at runtime to use only those specialized units that are needed for the context. The operating parameters can be altered by dynamically altering how a particular processing unit is allocated to the general purpose and specialized processing units.

For example, the PowerPC™ utilizes a prefetch unit. The prefetch unit shares prefetch streams between the general purpose units and the specialized processor units, such as the floating point processor and the VMX instruction units. The default allocation sharing assignment typically shares the prefetch unit equally between the general purpose units and the specialized units. Thus, the general purpose units receive 50% and the specialized units receive 50% of the prefetch unit's total time. The specialized units also typically equally share their portion of the prefetch unit's time. Thus, the floating point processor typically receives 50% and the VMX instruction units together receive 50% of the prefetch unit's time that is allocated to the specialized units.

The prefetch unit can be optimized according to whether the floating point unit and/or VMX instruction units will be needed for the next context. For example, if the next context indicates that the floating point unit will be used and the VMX instruction units will not be used, the operating parameters of the prefetch unit can be altered by allocating to the floating point unit 100% of the prefetch unit's time that is allocated to the specialized units. As another example, if a particular context does not require any specialized unit processing, the prefetch unit can be optimized by allocating 100% of the prefetch unit's total time to the general purpose units and none to the specialized units.

Other processing units in the processor core can be optimized in a similar manner by setting the parameters according to which specialized units are actually going to be used to process a context.

The allocation of a processing unit resource between general purpose units and specialized processing units can be changed dynamically during processing. The current allocation of a particular processing unit, such as a prefetch unit, is typically set in one or more allocation registers in the processing core. Thus, for example, information stored in these registers will indicate the amount of time the prefetch unit will be allocated to the general purpose units and the amount of time it will be allocated to the specialized processing units. Further, it may include an identification of which specialized units will be granted processing time. For example, if specialized processing units A, C, D, and E are all going to be used for the next process, but specialized processing unit B will not be used, the information in the registers will indicate that the prefetch unit will be allocated to specialized processing units A, C, D, and E, and not to unit B.

The specific example of pre-fetch streams used to speculatively retrieve instructions or data is of note. The default allocation when a VMX unit is used is to allow a number of streams under the control of the hardware and a number under the control of software via specific VMX instructions. If the VMX unit is not used, then all of the streams can be allocated to the hardware and potentially benefit performance of the other units.

According to the present invention, a determination is made using the contexts of the previous and next tasks as to which specialized processing units will be needed for the next context. The allocation of the processing units, such as the prefetch unit, is then changed so that the prefetch unit is allocated to only those specialized processing units that are needed by the next task.

The allocation can be changed dynamically during runtime by writing different information to the allocation registers in the processing core.

In addition, the processor may be optimized by altering the power state of the specialized processing units. The specialized processing units that were used by the previous context but not needed by the next context will be powered off while the specialized processing units that were not used by the previous context but that are needed by the next context are powered on. Specialized processing units that were used by the previous context and that are needed for the next context remain powered on. Specialized processing units that were not used by the previous context and are not needed for the next context remain powered off.

By powering on only those specialized units that are needed for a particular context and powering off all unneeded specialized units, the present invention provides a more efficient processor core and thus a more efficient CPU. In this manner, specialized processing units will not sit idle and waiting for work while powered on. As a result, the specialized processing units that are unnecessary for a particular context will not consume power or generate heat. They are disabled while the particular context is being processed.

The following is an overview of the processing of a processor. A processor includes a number of stages, such as the following, in the processor pipeline. In a typical first stage, referred to as an instruction fetch stage, an instruction is fetched from memory or associative memory structure. Each stage includes one or more pipelines. Then, in a decode stage, the instruction is decoded into different control bits, which in general designate (1) a type of functional unit for performing the operation specified by the instruction, (2) source operands for the operation, and (3) destinations for results of operations.

In a dispatch stage, the decoded instruction is dispatched per the control bits to a unit having an execution stage, or possibly to an intervening reservation station, which ultimately issues the instruction to an associated execution stage (also "execution unit").

The execution stage processes the operation as specified by the instruction. Executing an operation specified by an instruction includes accepting one or more operands and producing one or more results. Oftentimes the instructions will be out-of-order.

A completion stage deals with program order issues that arise from concurrent execution, wherein multiple, concurrently executed instructions may deposit results in a single register. It also handles recovery issues arising from instructions subsequent to an interrupted instruction depositing results in their destination registers. This stage is also sometimes called a write back stage since it is at this time that results of the execution of instructions are written back to designated locations such as registers.

Figure 1:
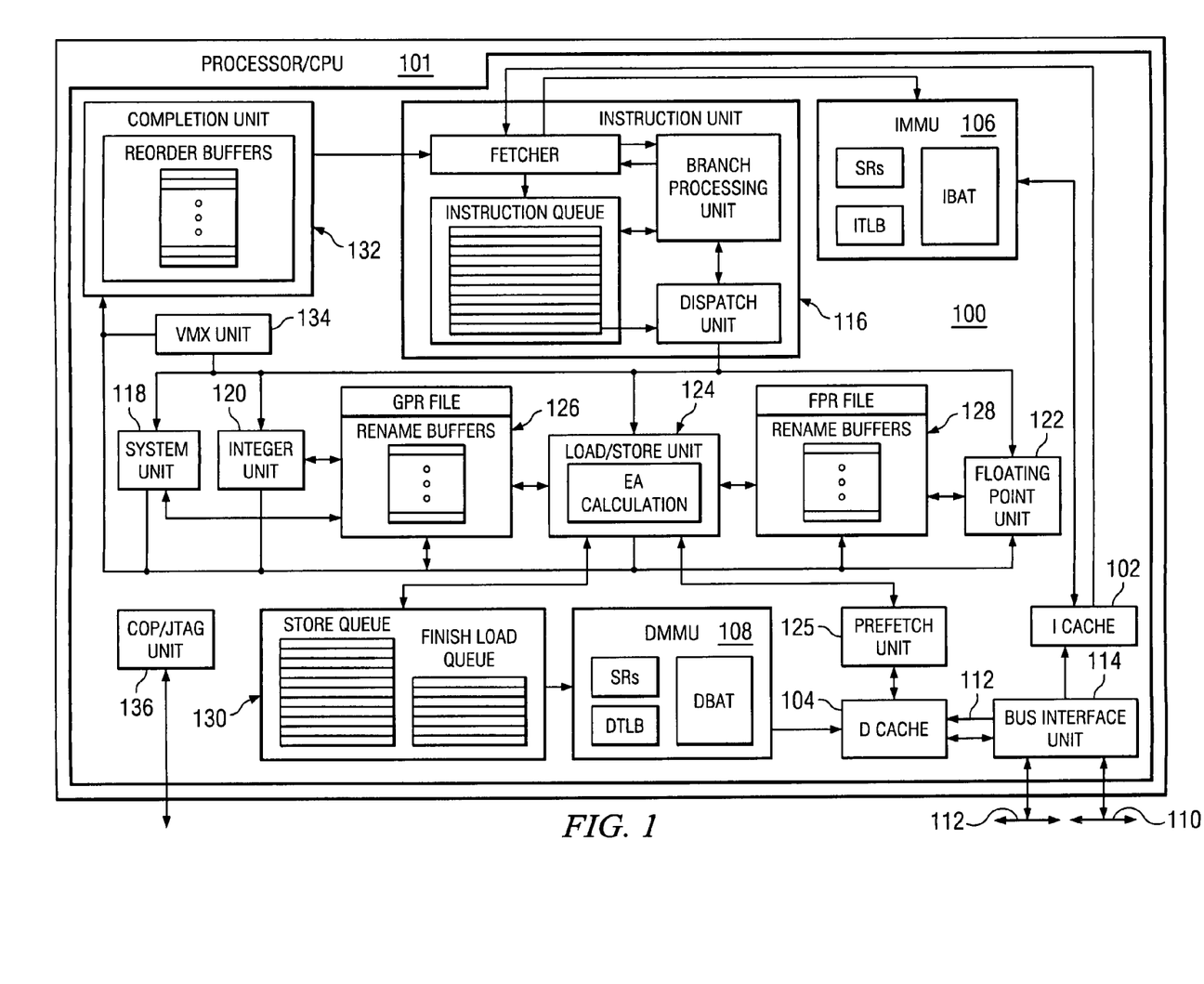
FIG. 1 is a block diagram of a superscalar processor that can be used to implement the present invention in accordance with the present invention.

With reference now to the figures, and in particular with reference to FIG. 1, FIG. 1 depicts a block diagram of a processor core in which a preferred embodiment of the present invention may be implemented are depicted. Processor core 100 is included within a processor/CPU 101 that is a single integrated circuit superscalar microprocessor (CPU), such as the PowerPC™ processor available from IBM Corporation of Armonk, N.Y. Accordingly, processor core 100 includes various processing units both specialized and general, registers, buffers, memories, and other sections, all of which are formed by integrated circuitry.

Processor core 100 includes level one (L1) instruction and data caches ("I Cache" and "D Cache") 102 and 104, respectively, each having an associated memory management unit ("I MMU" and "D MMU") 106 and 108. As shown in FIG. 1, processor core 100 is connected to system address bus 110 and to system data bus 112 via bus interface unit 114. Instructions are retrieved from system memory (not shown) to processor core 100 through bus interface unit 114 and are stored in instruction cache 102, while data retrieved through bus interface unit 114 is stored in data cache 104. Instructions are fetched as needed from instruction cache 102 by instruction unit 116, which includes instruction fetch logic, instruction branch prediction logic, an instruction queue, and a dispatch unit.

The dispatch unit within instruction unit 116 dispatches instructions as appropriate to execution units such as system unit 118, integer unit 120, floating point unit 122, or load/store unit 124. System unit 118 executes condition register logical, special register transfer, and other system instructions. Integer or "fixed-point" unit 120 performs add, subtract, multiply, divide, shift or rotate operations on integers, retrieving operands from and storing results in integer or general purpose registers ("GPR File") 126. Floating point unit 122 performs single precision and/or double precision multiply/add operations, retrieving operands from and storing results in floating point registers ("FPR File") 128. VMX unit 134 performs byte reordering, packing, unpacking, and shifting, vector add, multiply, average, and compare, and other operations commonly required for multimedia applications. Load/store unit 124 loads instruction operands from prefetch unit 125 into general purpose integer registers 126, floating point registers 128, or VMX unit 134 as needed, and stores instructions results when available from general purpose integer registers 126, floating point registers 128, or VMX unit 134 into data cache 104. These instruction operands were loaded into prefetch unit 125 from data cache 104. Load and store queues 130 are utilized for these transfers from prefetch unit 125 to and from integer registers 126, floating point registers 128, or VMX unit 134.

Completion unit 132, which includes reorder buffers, operates in conjunction with instruction unit 116 to support out-of-order instruction processing, and also operates in connection with rename buffers within general purpose integer register 126 and floating point register 128 to avoid conflict for a specific register for instruction results. Common on-chip processor ("COP") and joint test action group ("JTAG") unit 136 provides a serial interface to the system for performing boundary scan interconnect tests.

The architecture depicted in FIG. 1 is provided solely for the purpose of illustrating and explaining the present invention, and is not meant to imply any architectural limitations.

Those skilled in the art will recognize that many variations are possible. Processor core 100 may include, for example, multiple integer and floating point execution units to increase processing throughput. All such variations are within the spirit and scope of the present invention.

Figure 2:
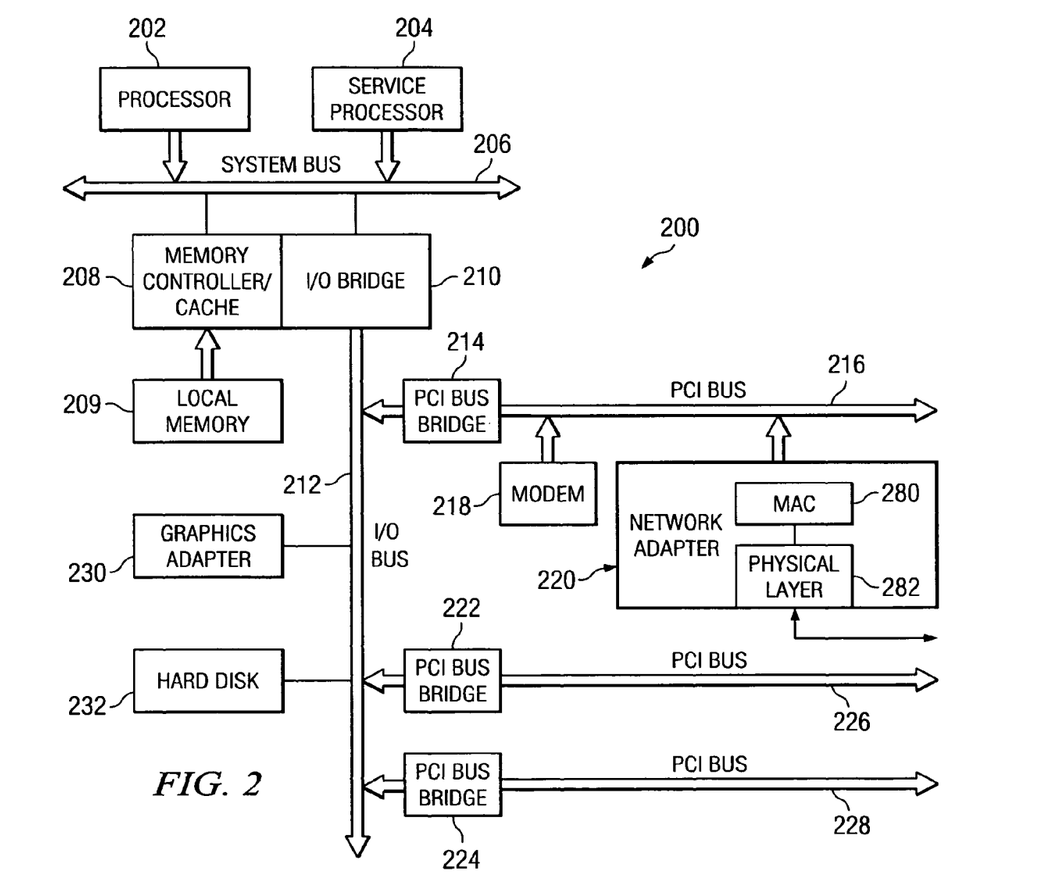
FIG. 2 is an illustration of a computer system which includes a processor, such as the one depicted by FIG. 1, in accordance with the present invention.

FIG. 2 is an illustration of a computer system which includes a processor, such as the one depicted by FIG. 1, in accordance with the present invention. Data processing system 200 may be a symmetric multiprocessor (SMP) system including a plurality of processors 202 and 204 connected to system bus 206. Alternatively, a single processor system may be employed. Each processor 202 and 204 may be an SMT-enabled processor. One processor may be a service processor, e.g. service processor 204. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to other computers may be provided through modem 218 and network adapter 220 connected to PCI local bus 216 through add-in boards.

Network adapter 220 includes a physical layer 282 which conditions analog signals to go out to the network, such as for example an Ethernet network over an R45 connector. A media access controller (MAC) 280 is included within network adapter 220. Media access controller (MAC) 280 is coupled to bus 216 and processes digital network signals. MAC 280 serves as an interface between bus 216 and physical layer 282.

Additional PCI bus bridges 222 and 224 provide interfaces for additional PCI buses 226 and 228, from which additional modems or network adapters may-be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
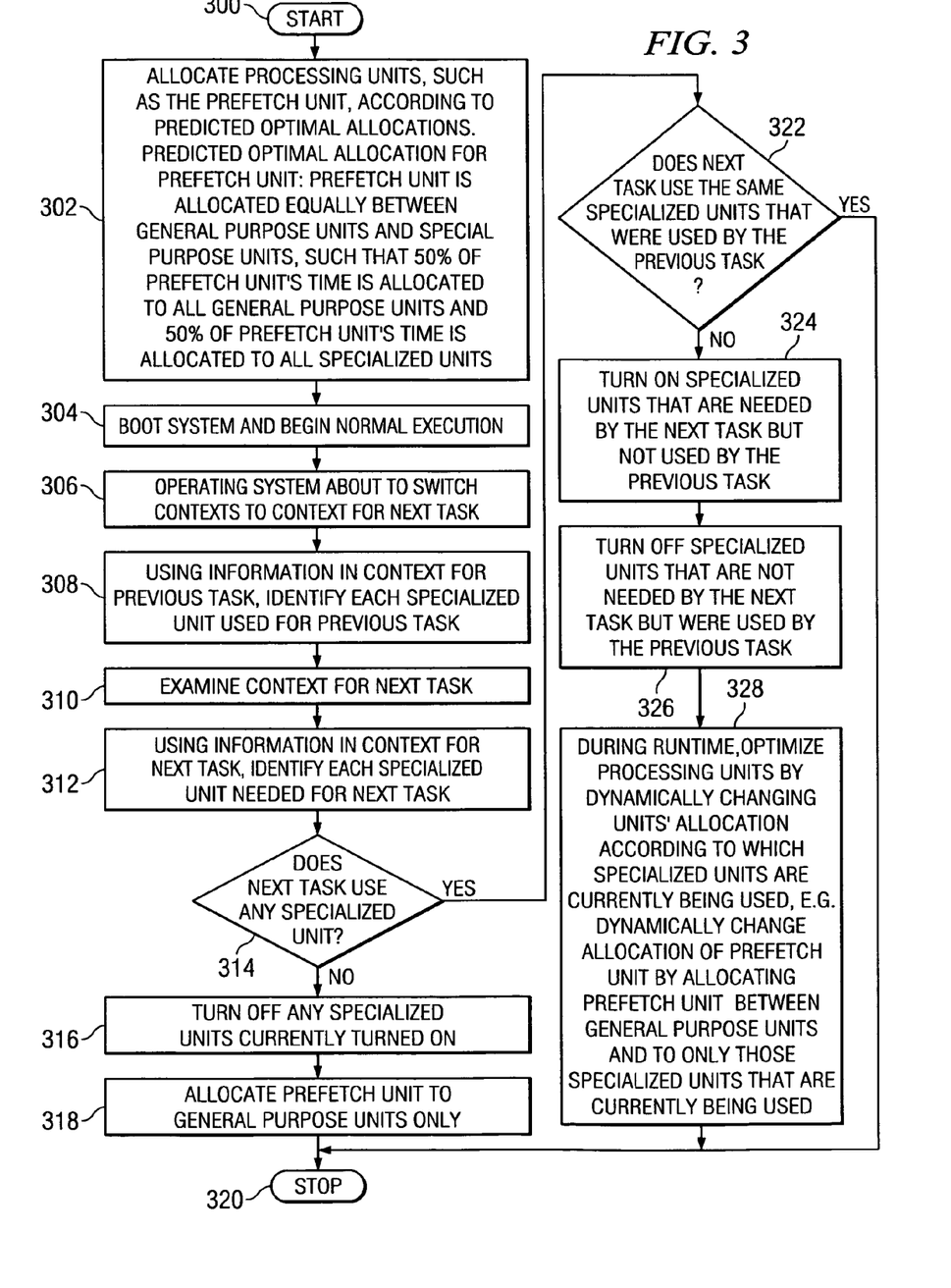
FIG. 3 depicts a high level flow chart that illustrates modifying the operating parameters of the processing units included in the processor core according to which instructions are being executed in accordance with the present invention.

FIG. 3 depicts a high level flow chart that illustrates modifying the operating parameters of the processing units included in the processor core according to which instructions are being executed in accordance with the present invention. The process starts as depicted by block 300 and thereafter passes to block 302 which illustrates allocating the processing units, such as the prefetch unit, according to predicted optimal allocations. The predicted optimal allocation for the prefetch unit includes the prefetch unit being allocated equally between the general purpose units and the special purpose units, such that 50% of the prefetch unit's time is allocated to all general purpose units and 50% of the prefetch unit's time is allocated to all of the specialized units. Block 304, then, illustrates booting the system and beginning normal execution with the predicted allocations. Next, block 306 depicts the operating system being about to switch contexts from a context for a previous task to a context for a next task. Block 308, then, illustrates using the information in the context for the previous task to identify each specialized unit that was used for the previous task.

The process then passes to block 310 which depicts examining the context for the next task. Thereafter, block 312 depicts using the information in the context for the next task to identify each specialized unit needed when executing the next task. Thereafter, block 314 illustrates a determination of whether or not the next task uses any specialized unit. If a determination is made that the next task does not use any specialized unit, the process passes to block 316 which depicts turning off any specialized units that are currently turned on. Next, block 318 illustrates allocating the prefetch unit to the general purpose units only. Thus, the prefetch unit is not allocated to any specialized unit. The process then terminates as depicted by block 320.

Referring again to block 314, if a determination is made that the next task does use at least one specialized unit, the process passes to block 322 which illustrates a determination of whether or not the next task uses the same specialized units that were used by the previous task. This determination is made by comparing the context for the previous task to the context of the next task. Each context will include an indication of which specialized units are needed for the task to be executed by the context. If a determination is made that the next task uses the same specialized units that were used by the previous task, the process terminates as illustrated by block 320.

Referring again to block 322, if a determination is made that the next task does not use the same specialized units that were used by the previous task, the process passes to block 324 which depicts turning on the specialized units that are needed by the next task but that were not used by the previous task. Thereafter, block 326 illustrates turning off the specialized units that are not needed by the next task but that were used by the previous task.

Next, block 328 depicts during runtime, optimizing the processing units by dynamically changing the units' allocation according to which specialized units are currently being used. For example, the allocation of the prefetch unit is dynamically changed by allocating the prefetch unit between the general purpose registers and to only those specialized units that are currently being used.

For example, assume a system with four specialized processing units where the predicted allocation grants 50% of the prefetch unit's time to the general purpose units and 50% of the prefetch unit's time to the specialized processing units. Also assume the each specialized processing unit is granted 25% of the 50% of the time granted to the specialized units. If only one specialized processing unit is to be used for the next context and the remaining specialized units are not going to be used, the prefetch unit's time might be allocated such that the general purpose registers receive-more than 50% of the prefetch unit's time. Further, the time allocated to the particular specialized processing unit may be 100%, instead of 25%, of the time that is allocated to the specialized processing units. The process then terminates as illustrated by block 324.

Figure 4:
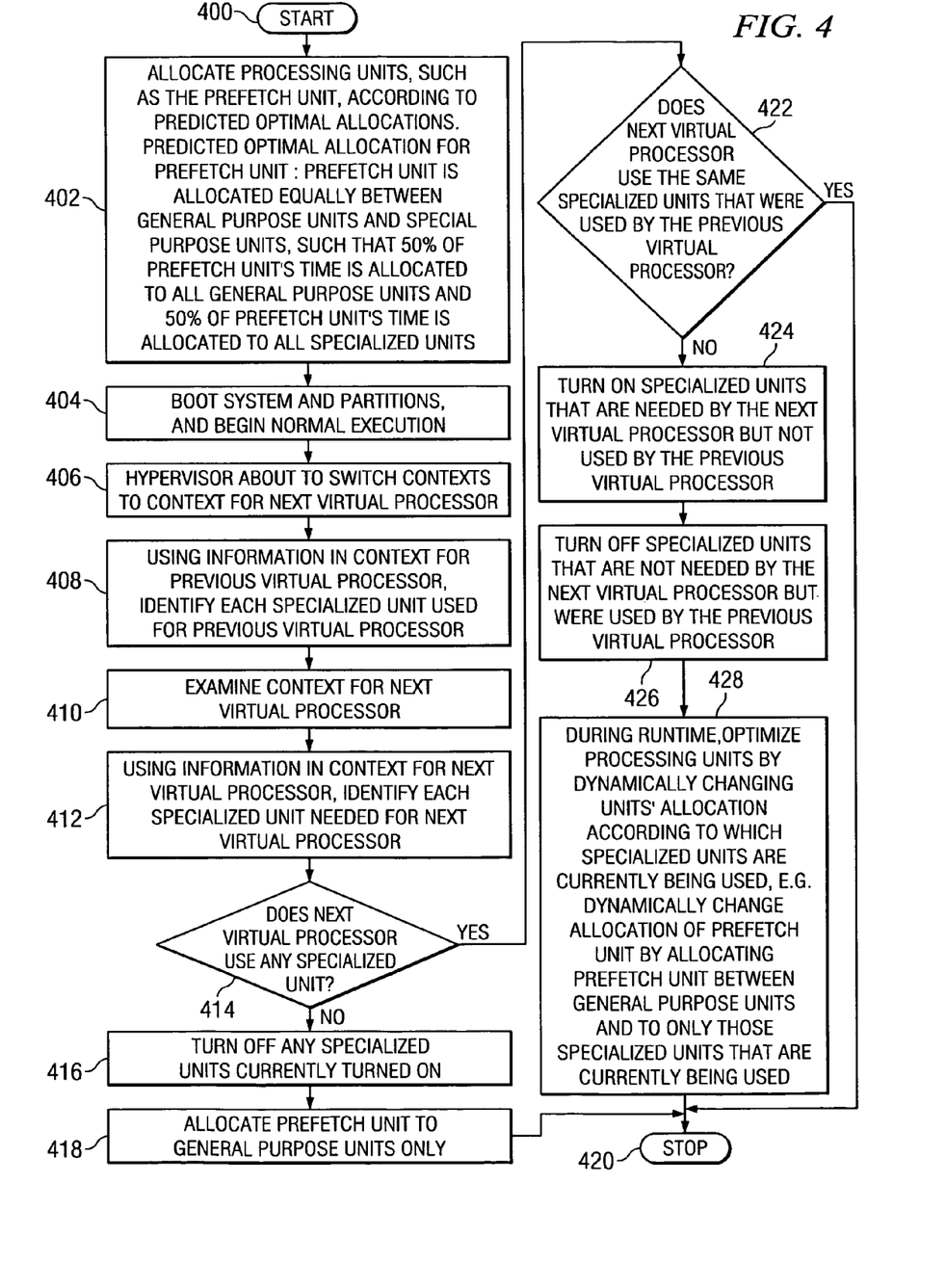
FIG. 4 illustrates a high level flow chart that depicts modifying the operating parameters of the processing units included in the processor core according to which instructions are being executed in a virtual processor machine when a hypervisor switches between virtual processors in accordance with the present invention.
Figure 5:
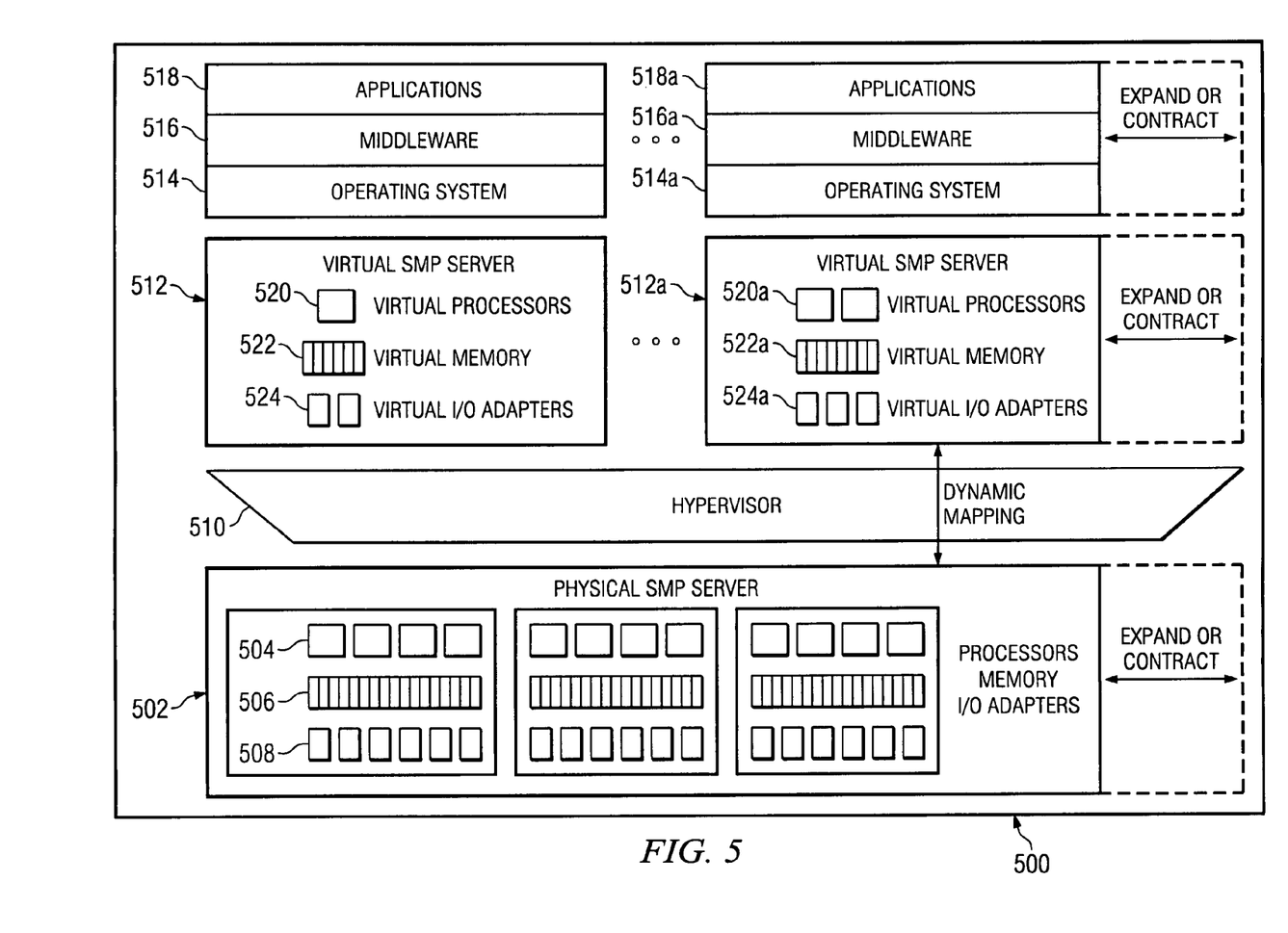
FIG. 5 is a block diagram of a data processing system, including a hypervisor, in which the present invention may be implemented.

The present invention may also be used in a virtual processor machine, such as depicted by FIG. 5, where a hypervisor is responsible for managing virtual processors. FIG. 4 illustrates a high level flow chart that depicts modifying the operating parameters of the processing units included in the processor core according to which instructions are being executed in a virtual processor machine when a hypervisor switches between virtual processors in accordance with the present invention. The process starts as depicted by block 400 and thereafter passes to block 402 which illustrates allocating the processing units, such as the prefetch unit, according to predicted optimal allocations. The predicted optimal allocation for the prefetch unit includes the prefetch unit being allocated equally between the general purpose units and the special purpose units, such that 50% of the prefetch unit's time is allocated to all general purpose units and 50% of the prefetch unit's time is allocated to all of the specialized units. Thereafter, block 404 depicts booting the system and partitions, and beginning normal processing with the predicted allocations being used. Next, block 406 depicts the hypervisor being about to switch contexts to a context for a next virtual processor. Block 408, then, illustrates using the information in the context for the previous virtual processor to identify each specialized unit that was used for the previous virtual processor.

The process then passes to block 410 which illustrates examining the context for the next virtual processor. Thereafter, block 412 depicts using the information in the context for the next virtual processor to identify each specialized unit needed when executing the next virtual processor. Thereafter, block 414 illustrates a determination of whether or not the next virtual processor uses any specialized unit. If a determination is made that the next virtual processor does not use any specialized unit, the process passes to block 416 which depicts turning off any specialized units that are currently turned on. Next, block 418 illustrates allocating the prefetch unit to the general purpose units only. Thus, the prefetch unit is not allocated to any specialized unit. The process then terminates as depicted by block 420.

Referring again to block 414, if a determination is made that the next virtual processor does use at least one specialized unit, the process passes to block 422 which illustrates a determination of whether or not the next virtual processor uses the same specialized units that were used by the previous virtual processor. If a determination is made that the next virtual processor uses the same specialized units that were used by the previous virtual processor, the process terminates as illustrated by block 420.

Referring again to block 422, if a determination is made that the next virtual processor does not use the same specialized units that were used by the previous virtual processor, the process passes to block 424 which depicts turning on the specialized units that are needed by the next virtual processor but that were not used by the previous virtual processor. Thereafter, block 426 illustrates turning off the specialized units that are not needed by the next virtual processor but that were used by the previous virtual processor. Next, block 428 depicts during runtime, optimizing the processing units by dynamically changing the units' allocation according to which specialized units are currently being used. For example, the allocation of the prefetch unit is dynamically changed by allocating the prefetch unit between the general purpose registers and to only those specialized units that are currently being used. The process then terminates as illustrated by block 420.

FIG. 5 is a block diagram of a data processing system 500, including a hypervisor, in which the present invention may be implemented. System 500 is preferably a symmetric multi-processing (SMP) server computer system. SMP server computer system 500 includes physical hardware devices that can be mapped to, i.e. temporarily owned by, a user application to execute that application.

SMP server computer system 500 includes a physical SMP server 502. Physical SMP server 502 includes physical hardware devices such as processors 504, memory 506, and I/O adapters 508. These physical devices are managed by hypervisor 510. Each one of the processors 504 is preferably a simultaneous multithreaded (SMT) processor that is capable of concurrently executing multiple different threads on the processor.

A virtual server is a proxy for a physical server that has the same capabilities, interfaces, and state. Virtual servers are created and managed by a hypervisor that resides on physical SMP server computer system 500. A virtual server appears to be a physical SMP server to its user: the operating system, middleware, and application software that run upon it. SMP server computer system 500 includes one or more virtual servers such as virtual server 512 and virtual server 512a.

Each virtual server appears to its software to include its own virtual processor(s), memory, and I/O adapter(s) that are available for the exclusive use of that virtual server. For example, virtual server 512 includes a virtual processor 520, virtual memory 522, and virtual I/O adapters 524. Virtual server 512a includes virtual processors 520a, virtual memory 522a, and virtual I/O adapters 524a.

Each virtual server supports its own software environment, including an operating system, middleware, and applications. The software environment of each virtual server can be different from the software environment of other virtual servers. For example, the operating systems executed by each virtual server may differ from one another.

For example, virtual server 512 supports operating system 514, middleware 516, and applications 518. Virtual server 512a supports operating system 514a, middleware 516a, and applications 518a. Operating systems 514 and 514a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 510 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 504, is selected by hypervisor 510 to be used to execute and implement that virtual processor. Hypervisor 510 manages the selections of physical devices and their temporary assignment to virtual devices.

Hypervisor 510 is responsible for dynamically creating, managing, and destroying virtual SMP servers. Whole virtual processors, virtual I/O adapters, and virtual memory blocks can be removed or added by hypervisor 510. Hypervisor 510 is also responsible for dynamic resource allocation, managing time-sharing of physical resources, and altering the physical resource mapped to a processor without involving the operating system. Hypervisor 510 is also able to dedicate physical resources to virtual resources for situations where sharing is not desired. Hypervisor 510 is responsible for managing the addition or removal of physical resources. Hypervisor 510 makes these additions and deletions transparent to the upper level applications.

Figure 6:
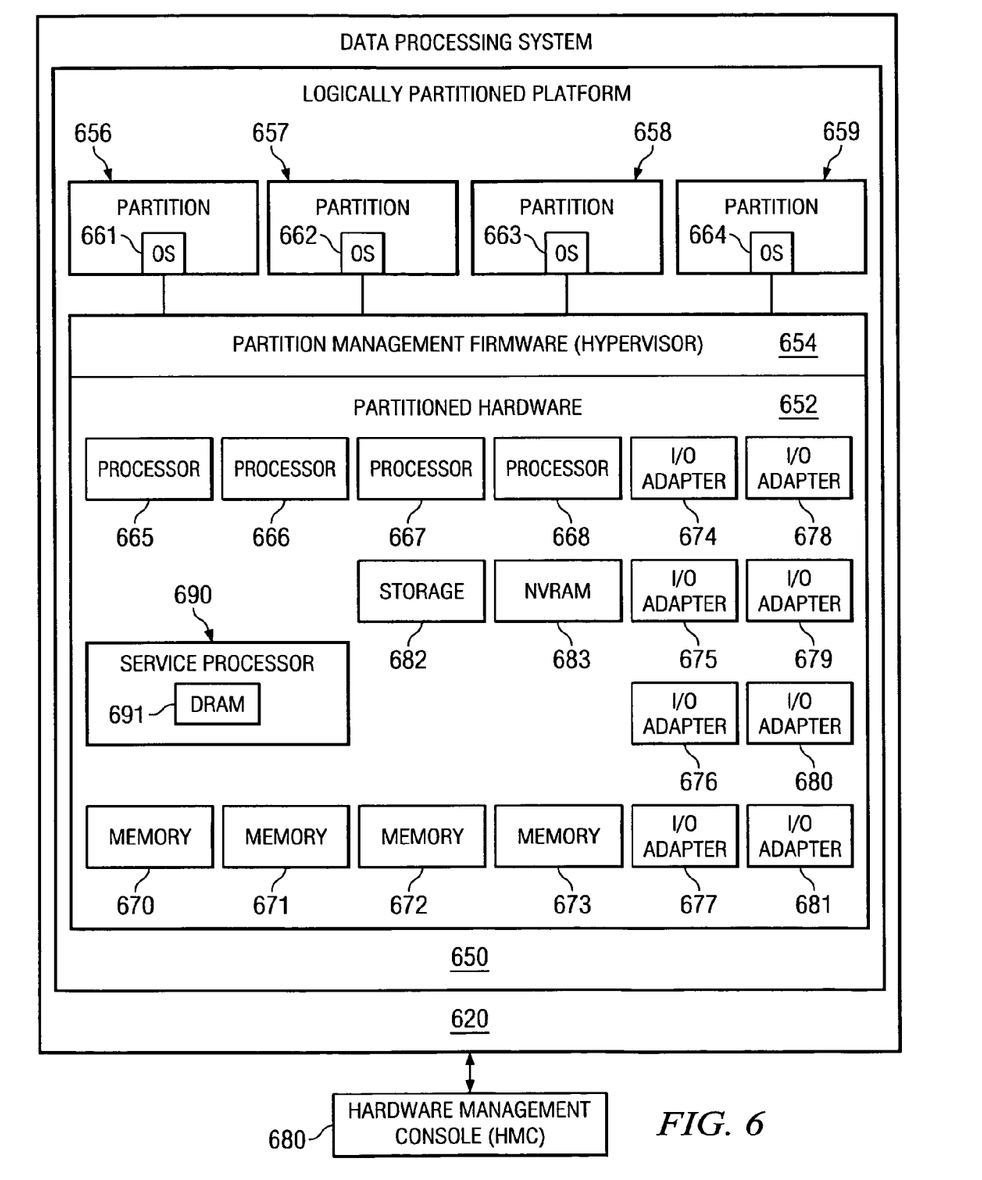
FIG. 6 is a block diagram of a logically partitioned platform that includes the present invention in accordance with the present invention.

FIG. 6 is a block diagram of a logically partitioned platform that includes the present invention. Data processing system 620 includes logically partitioned platform 650. Platform 650 includes partitioned hardware 652, partition management firmware, also called a hypervisor 654, and partitions 656-659. Operating systems 661-664 exist within partitions 656-659. Operating systems 661-664 may be multiple copies of a single operating system or multiple heterogeneous operating systems simultaneously run on platform 650.

Partitioned hardware 652 includes a plurality of SMT-capable processors 665-668, a plurality of system memory units 670-673, a plurality of input/output (I/O) adapters 674-681, and a storage unit 682. Each of the processors 665-668, memory units 670-673, NVRAM storage 683, and I/O adapters 674-681 may be assigned to one of multiple partitions 656-659. Partitioned hardware 652 also includes service processor 690. A non-volatile memory device 691, such as an NVRAM device, is included within service processor 690.

Partition management firmware (hypervisor) 654 performs a number of functions and services for partitions 656-659 to create and enforce the partitioning of logically partitioned platform 650. Hypervisor 654 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 654 allows the simultaneous execution of independent OS images 661-664 by virtualizing all the hardware resources of logically partitioned platform 250. Hypervisor 654 may attach I/O devices through I/O adapters 674-681 to single virtual machines in an exclusive mode for use by one of OS images 661-664.

A hardware management console (HMC) 680 may be coupled to service processor 690 in data processing system 620. HMC 680 is a separate computer system that is coupled to service processor 690 and may be used by a user to control various functions of system 620 through service processor 690.

It is important to note that while the present invention has been described in the context of a fully functioning data processing system, Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for dynamically modifying operating parameters of processing units included in a processor core included within a central processing unit (CPU), said method comprising:

allocating, according to a predicted optimal allocation, a first processing unit's processing time among general purpose processing units and specialized processing units, wherein said general purpose processing units and said specialized processing units are included in said CPU, and wherein each one of said general purpose processing units and each one of said specialized processing units being independently powered on and off;

retrieving a next context to be processed, said next context including an identification of all first specialized processing units in said processor core that will be needed to process said next context, said specialized processing units including said first specialized processing units and other unused specialized processing units;

dynamically altering said predicted optimal allocation of said first processing unit's time, said first processing unit's processing time being allocated among said general purpose processing units and said first processing units, and not among said unused specialized processing units; and prior to said processing core that includes said first processing unit executing said next context, dynamically altering said predicted optimal allocation according to an expected usage of ones of said special processing units.

2. The method according to claim 1, further comprising:
identifying all second specialized processing units that were needed to process a previous context that has just finished being processed by said processor core;
comparing said first specialized processing units to said second specialized processing units to generate an identification of all third specialized processing units that were needed for said previous context but that are not needed for said next context and all fourth specialized processing units that were not needed for said previous context but that are needed for said next context;
disabling said third specialized processing units and enabling said fourth specialized processing units;
wherein each one of said specialized processing units being independently disabled and enabled.

3. The method according to claim 2, further comprising:
disabling said third specialized processing units by powering said third specialized processing units off; and
enabling said fourth specialized processing units by powering said fourth specialized processing units on.

4. The method according to claim 1, further comprising:
allocating said first processing unit's processing time including allocating a prefetch unit's processing time, said first processing unit being said prefetch unit.

5. The method according to claim 1, further comprising:
said first processing unit's processing time being allocated, after said dynamic alteration, to only ones of said specialized processing units that will be needed to process said next context.

6. The method according to claim 1, further comprising:
allocating, according to said predicted optimal allocation, a first percentage of said first processing unit's processing time to said general purpose units;
allocating, according to said predicted optimal allocation, a second percentage of said first processing unit's processing time to said specialized processing units;
determining that none of said specialized processing units will be needed to process said next context; and
dynamically allocating all of said first processing unit's processing time to said general purpose units.

7. The method according to claim 1, further comprising:
wherein said general purpose units includes an instruction sequencing unit and an integer unit;
wherein said specialized processing units including a floating point processing unit; and
wherein said instruction sequencing unit, said integer unit, and said floating point processing unit are hardware units.

8. An apparatus in a data processing system for dynamically modifying operating parameters of processing units included in a processor core included within a central processing unit (CPU), said apparatus comprising:

said processor core allocating, according to a predicted optimal allocation, a first processing unit's processing time among general purpose processing units and specialized units, wherein said general purpose processing units and said specialized processing units are included in said CPU, and wherein each one of said general purpose processing units and each one of said specialized processing units being independently powered on and off;

said processor core retrieving a next context to be processed, said next context including an identification of all first specialized processing units in said processor core that will be needed to process said next context, said specialized processing units including said first specialized processing units and other unused specialized processing units;

said processor core dynamically altering said predicted optimal allocation of said first processing unit's time, said first processing unit's processing time being allocated among said general purpose processing units and said first processing units, and not among said unused specialized processing units; and prior to said processing core that includes said first processing unit executing said next context, said processor core dynamically altering said predicted optimal allocation according to an expected usage of ones of said special processing units.

9. The apparatus according to claim 8, further comprising:

said processor core identifying all second specialized processing units that were needed to process a previous context that has just finished being processed by said processor core;

said processor core comparing said first specialized processing units to said second specialized processing units to generate an identification of all third specialized processing units that were needed for said previous context but that are not needed for said next context and all fourth specialized processing units that were not needed for said previous context but that are needed for said next context;

said processor core disabling said third specialized processing units and enabling said fourth specialized processing units;

wherein each one of said specialized processing units being independently disabled and enabled.

10. The apparatus according to claim 9, further comprising:

said processor core disabling said third specialized processing units by powering said third specialized processing units off; and said processor core enabling said fourth specialized processing units by powering said fourth specialized processing units on.

11. The apparatus according to claim 8, further comprising:

said first processing unit being a prefetch unit.

12. The apparatus according to claim 8, further comprising:

said first processing unit's processing time being allocated, after said dynamic alteration, to only ones of said specialized processing units that will be needed to process said next context.

13. The apparatus according to claim 8, further comprising:

said processor core allocating, according to said predicted optimal allocation, a first percentage of said first processing unit's processing time to said general purpose units;

said processor core allocating, according to said predicted optimal allocation, a second percentage of said first processing unit's processing time to said specialized processing units;

said processor core determining that none of said specialized processing units will be needed to process said next context; and said processor core dynamically allocating all of said first processing unit's processing time to said general purpose units.

14. The apparatus according to claim 8, further comprising:

wherein said general purpose units includes an instruction sequencing unit and an integer unit;

wherein said specialized processing units including a floating point processing unit; and wherein said instruction sequencing unit, said integer unit, and said floating point processing unit are hardware units.

15. A computer program product, which is stored in a computer recordable-type medium, for dynamically modifying operating parameters of processing units included in a processor core included within a central processing unit (CPU) in a data processing system, said product comprising:

instructions for allocating, according to a predicted optimal allocation, a first processing unit's processing time among general purpose processing units and specialized processing units, wherein said general purpose processing units and said specialized processing units are included in said CPU, and wherein each one of said general purpose processing units and each one of said specialized processing units being independently powered on and off;

instructions for retrieving a next context to be processed, said next context including an identification of all first specialized processing units in said processor core that will be needed to process said next context, said specialized processing units including said first specialized processing units and other unused specialized processing units;

instructions for dynamically altering said predicted optimal allocation of said first processing unit's time, said first processing unit's processing time being allocated among said general purpose processing units and said first processing units, and not among said unused specialized processing units; and prior to said processing core that includes said first processing unit executing said next context, instructions for dynamically altering said predicted optimal allocation to only ones of said specialized processing units that will be needed to process said next context.

16. The computer program product according to claim 15, further comprising:

instructions for identifying all second specialized processing units that were needed to process a previous context that has just finished being processed by said processor core;

instructions for comparing said first specialized processing units to said second specialized processing units to generate an identification of all third specialized processing units that were needed for said previous context but that are not needed for said next context and all fourth specialized processing units that were not needed for said previous context but that are needed for said next context;

instructions for disabling said third specialized processing units by powering said third specialized processing units off; and instructions for enabling said fourth specialized processing units by powering said fourth specialized processing units on.

17. The computer program product according to claim 15, further comprising:

instructions for allocating said first processing unit's processing time including allocating a prefetch unit's processing time, said first processing unit being said prefetch unit.

* * * * *